Figure 1:
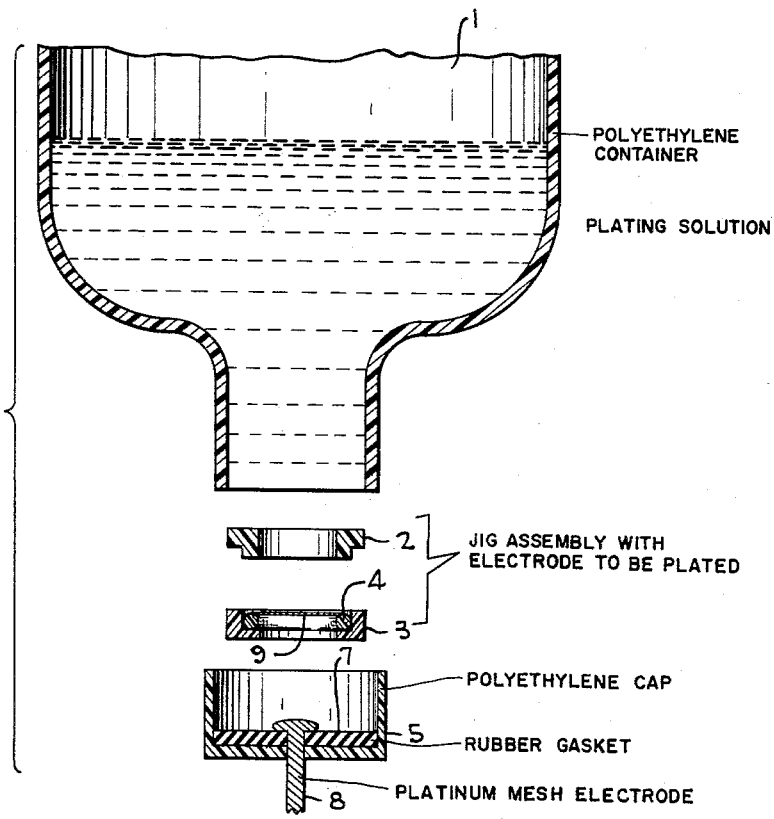

Nov. 23, 1965  S. M. CHODOSH ETAL  3,219,481
METHOD OF COATING A PALLADIUM SILVER ALLOY MEMBRANE
Filed April 27, 1962

INVENTORS
Stewart M. Chodosh
and
Frank Malaspina, Jr

BY
ATTORNEYS 3,219,481
METHOD OF COATING A PALLADIUM SILVER ALLOY MEMBRANE
Stewart M. Chodosh, River Edge, N.J., and Frank Malaspina, Jr., Jericho, N.Y., assignors to Leesona Corporation, Warwick, R.I., a corporation of Massachusetts
Filed Apr. 27, 1962, Ser. No. 190,683
6 Claims. (Cl. 117—213)

This invention relates to an improved method of depositing a thin coating of black, such as palladium black, upon a pre-formed structure. More specifically, the improved method of coating with a black comprises pre-exposing the surface to be plated to hydrogen, and thereafter, depositing from a solution of the coating material.

In the prior art, it is known to deposit thin films of palladium or platinum black on one or more surfaces of an electrode structure in order to obtain increased activity. Thus, in the fuel cell art, electrodes including homoporous, bi-porous and non-porous structures are treated with palladium or platinum black to enhance their activity for reaction with conventional fuels, as well as to protect the electrode surfaces against poisoning. The blacks being finely divided, provide an extremely large reactive surface area. For example, platinum black will adsorb up to about 100 times its volume of oxygen and about 10 times its volume of hydrogen. Electrodes which have been coated possess excellent electrochemical characteristics and are particularly useful in fuel cell systems operating at relatively low temperatures.

In the prior art, coatings of black are usually applied by electro-deposition from an aqueous solution of the coating material. It has been found, however, that certain coatings, particularly when applied to a thin non-porous palladium-silver alloy membrane, are not adherent. Thus, although the film may initially appear to adhere to the structure being plated, upon prolonged use as an electrode, the black flakes or peels from the structure.

Accordingly, it is an object of the instant invention to provide a method of depositing a thin adhering coating of black on an electrode structure.

It is another object of this invention to deposit a surface of black to an electrode surface in controlled ratios.

It is another object of this invention to deposit a uniform adhering surface of palladium black to a thin non-porous palladium-silver alloy membrane.

These and other objects of the invention will become more apparent from the following detailed description with particular emphasis being placed on the illustrative examples.

In general, the objects of the instant invention are accomplished by pre-exposing a structure to be coated with palladium-silver alloy membrane, are not adherent. can be performed by passing hydrogen into the membrane at a high temperature and at a positive pressure. Other techniques include cathodic treatment in dilute sulphuric acid or dilute potassium hydroxide. After pre-exposure to hydrogen, the structure can be plated by immersion in a solution of the plating metal, for example, a 2% aqueous solution of $PdCl_2$. The hydrogen acts as a reducing agent, effecting the deposition of the black. The quantity of the coating can be controlled depending upon the period of time the structure is exposed to hydrogen and by the length of time the structure is exposed to the plating solution.

The resultant structure is highly reactive as a fuel cell electrode, with the coating adhering tenaciously to the structure being plated. Thus, after prolonged periods of exposure to aqueous alkaline electrolytic solutions under operating conditions of a fuel cell, no loss of adhesion of the plating was noted.

The quantity of the black coating is not particularly critical, however, for satisfactory electrochemical performance characteristics of an electrode, the coating should uniformly cover the surface of the structure. Using the instant method, depending upon the thickness of the membrane being coated, up to 45 milligrams, or more, of black per square centimeter of electrode can be deposited. From a practical standpoint, any amount of black can be deposited by recathodic treatment of the structure. Regardless of the amount laid down, the coating is substantially uniform.

Depending upon the ultimate use of the activated structures, it can be desirable to coat one surface of a non-porous structure with one thickness of black and the second surface with a different thickness, or the second surface can be coated with a different material. The coating of the separate surfaces with different blacks or with different thicknesses of the same black can be accomplished by exposing both surfaces of the structure to hydrogen and thereafter coat one side with one black and after completion coat the second surface. When this procedure is followed, there is a tendency for some of the hydrogen adsorbed by the electrode to be lost. Thus, it may be desirable to expose the surface to be plated to an additional cathodic treatment before plating the second surface. Depending upon the techniques employed, modifications in the structures are obtainable.

Figure 2:
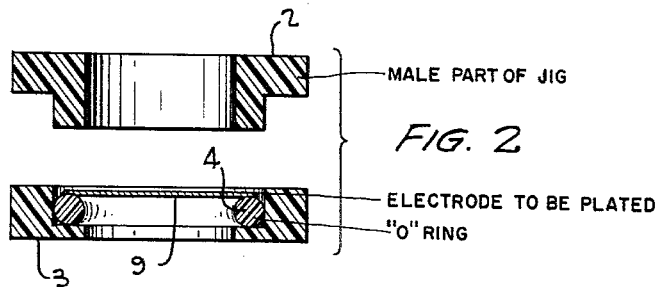

One method of obtaining a different coating on the separate surfaces to be plated can be accomplished using the apparatus shown in FIGURES 1 and 2 of the drawing. Thus, FIGURE 1 is a diagrammatic illustration of a container and jig for performing the coating and FIGURE 2 is an enlarged view of the jig.

More specifically, polyethylene container 1 is adapted to receive the polyethylene cap 5. The male portion of the Teflon jig 2 is adapted to fit into the portion of the jig 3. An O-ring 4 constructed from a suitable polymer, such as Vyton, fits into the female part of the jig. Electrode 9 is placed on the O-ring across the female portion of the jig. A silicone rubber gasket 7 is positioned across the polyethylene cap and a platinum mesh electrode 8 is brought in contact therewith. The plating solution is fed into the container and plating is carried out using a suitable electrical source, if one is needed. Other methods and apparatus of carrying out the operation can be advanced by one skilled in the art. Additionally, it is apparent that it may not be desirable or necessary on all occasions to plate both sides of a structure. By means of the above-described apparatus, the plating of one side only can be conveniently accomplished.

In the instant invention, depending upon the plating material, it is not always necessary to apply an electrical current when depositing. Thus, when plating with palladium black, the black can be deposited directly from an aqueous solution of $PdCl_2$. However, when employing platinum or rhodium, it is necessary to apply an electric current. The current can be from any convenient source, such as a storage battery.

Having described the invention in general terms, the following examples are set forth to more particularly illustrate the invention. However, they are not to be construed as limiting. Other embodiments can be conveniently produced without departing from the scope of the instant invention.

*Example 1*

A 75% palladium-25% silver alloy membrane 5 mils thick and 2¼ inches in diameter was cleaned by air abrading with finely powdered aluminum oxide.. Thereafter, the membrane was suspended in a 5% aqueous potassium hydroxide bath. Platinum anodes were inserted in the potassium hydroxide bath on each side of the non-porous palladium-silver alloy membrane. Two anodes are employed to prevent curling of the electrodes being plated. Current is applied from a battery source. The electrode is kept in the aqueous potassium hydroxide bath for five minutes at which time a curtain of bubbles appears on the face of the electrode. The time of the treating is not important, it only being necessary to obtain a complete or substantially complete curtain of bubbles on the surface to be plated. The palladium-silver membrane is removed from the electrolyte bath and rinsed with distilled water. The membrane is then immersed in a 2% PdCl$_2$ bath. The membrane is kept in the bath for 6 minutes, depositing a film of palladium black on the membrane. Approximately 4 milligrams of palladium are deposited per square centimeter of membrane surface. The electrode structure is washed with distilled water to remove excess PdCl$_2$ solution. Both sides of the membrane are coated. The operation is performed at room temperature.

*Example 2*

A non-porous 75% palladium-25% silver alloy membrane 2¼ inches in diameter and 1½ mils thick was plated with a palladium black film by the procedure set forth in Example 1. The reduction in PdCl$_2$ was carried out for three minutes depositing approximately 2 milligrams palladium per square centimeter of palladium-silver alloy structure.

*Example 3*

Employing the apparatus illustrated in FIGURES 1 and 2 of the drawing, a non-porous 75% palladium-25% silver alloy membrane 2¼ inches in diameter and 1½ mils thick was coated on one surface depositing 11.4 milligrams of palladium black per square centimeter and the second surface plated with 4.9 milligrams of palladium black per square centimeter.

*Example 4*

Employing the apparatus illustrated in FIGURES 1 and 2 of the drawing, a 1.5 mil thick non-porous palladium-silver alloy membrane 2¼ inches in diameter was coated on one surface depositing 6.3 milligrams of palladium black per square centimeter and the second surface plated with 7.0 milligrams of platinum black per square centimeter.

In Examples 1–4, the non-porous palladium-silver alloy membrane can be replaced with other structures includes homo-porous and bi-porous paladium-silver alloy electrodes. Additionally, in Examples 1–4, the black on the second surface can be replaced by platinum black, rhodium black and palladium-rhodium black.

In Examples 1–4, the pre-exposure to hydrogen can be accomplished in an aqueous acid bath in place of an alkaline bath. Additionally, the exposure to hydrogen can be carried out at high temperatures and pressures.

The structures prepared according to the instant invention have particular utility as fuel cell electrodes. Thus, the structure of Example 1 was employed as the anode in a fuel cell system. The cathode was a cobalt-nickel activated bi-porous nickel electrode. The electrolyte was a 75% aqueous potassium hydroxide solution. The cell when operated at a temperature of 200° C., employed impure hydrogen as the fuel and air as the oxidant, at .945 volt including 50 milivolts electrolyte IR drop provided a current of 150 ma./cm.$^2$.

While various modifications of this invention are described, it should be appreciated that the invention should not be restricted thereto, but that other embodiments will be apparent to one skilled in the art which come within the scope and spirit of the invention and the appended claims.

What is claimed is:

1. In the method of chemically depositing a non-self-supporting, high surface area film of palladium black onto at least one surface of a palladium silver alloy membrane, the improvement comprising the steps of exposing said membrane to hydrogen in a fluid system to obtain hydrogen in said membrane, and thereafter to a solution of a palladium salt whereby a uniform, adherent film of palladium black is deposited onto said membrane.

2. The method of claim 1, wherein the solution of paladium salt is a 2% solution of palladium chloride.

3. The method of claim 1, wherein the membrane is the cathode of an electrolytic system in an acid electrolyte, and thereby exposed to hydrogen.

4. The method of claim 3, wherein the acid electrolyte is replaced by an alkaline electrolyte.

5. The method of claim 1 wherein the membrane is non-porous.

6. The method of claim 1 wherein both surfaces of the membrane are coated with palladium black.

References Cited by the Examiner

UNITED STATES PATENTS 2,226,720  12/1940  Hansell _____ 117—227 XR
2,854,353  9/1958  Schwope _____ 117—106

OTHER REFERENCES

Spencer: "Metal Finishing," vol. 58, No. 6, June 1960, pp. 53–58.

WILLIAM D. MARTIN, *Primary Examiner.*

RICHARD D. NEVIUS, MURRAY KATZ, *Examiners.*

UNITED STATES PATENT OFFICE
CERTIFICATE OF CORRECTION

Patent No. 3,219,481 November 23, 1965

Stewart M. Chodosh et al.

It is hereby certified that error appears in the above numbered patent requiring correction and that the said Letters Patent should read as corrected below.

Column 1, line 54, strike out "palladium-silver alloy membrane, are not adherent." and insert instead -- palladium black to hydrogen. The exposure to hydrogen --; column 2, line 47, for "desirabe" read -- desirable --; column 3, line 50, for "includes" read -- including --; column 4, line 12, for "employed" read -- employing --; line 13, for "volt including 50 milivolts" read -- volts including 50 millivolts --; line 31, for "paladium" read -- palladium --.

Signed and sealed this 1st day of August 1967.

(SEAL)
Attest:

EDWARD M. FLETCHER, JR.
Attesting Officer

EDWARD J. BRENNER
Commissioner of Patents